US005474856A

United States Patent [19]

[11] Patent Number: 5,474,856

[45] Date of Patent: Dec. 12, 1995

Tamagawa et al.

[54] PHOTOGRAPHIC PRINTING PAPER SUPPORT

[75] Inventors: Shigehisa Tamagawa; Shinichiro Serizawa; Jun Naitoh, all of Fujinomiya, Japan

[73] Assignee: Fuji Photo Film Co., Ltd., Kanagawa, Japan

[21] Appl. No.: 281,072

[22] Filed: Jul. 27, 1994

[30] Foreign Application Priority Data

| | | | |
|---|---|---|---|
| Jul. 28, 1993 | [JP] | Japan | 5-207320 |
| Jul. 28, 1993 | [JP] | Japan | 5-207321 |

[51] Int. Cl.$^6$ .......... G03C 1/775; B32B 29/00

[52] U.S. Cl. .......... 428/537.5; 428/411.1; 428/511; 428/513; 428/530; 430/538; 162/158; 162/164.1; 162/164.3; 162/164.6; 162/168.3; 162/175; 162/177

[58] Field of Search .......... 428/411.1, 511, 428/513, 530, 537.5; 430/538, 271; 162/135, 136, 158, 164.1, 164.3, 164.6, 168.3, 175, 177

[56] References Cited

U.S. PATENT DOCUMENTS

| | | | |
|---|---|---|---|
| 4,517,285 | 5/1985 | Woodward et al. | 430/538 |
| 4,665,014 | 5/1987 | Katsura | 430/538 |
| 4,902,600 | 12/1990 | Tamagawa et al. | 430/138 |
| 5,122,231 | 6/1992 | Anderson | 162/175 |
| 5,168,034 | 12/1992 | Tamagawa et al. | 430/536 |
| 5,213,888 | 5/1993 | Kubbota et al. | 428/328 |
| 5,362,614 | 11/1994 | Serizawa et al. | 430/538 |

*Primary Examiner*—Patrick J. Ryan
*Assistant Examiner*—Marie R. Yamnitzky
*Attorney, Agent, or Firm*—Sughrue, Mion, Zinn, Macpeak & Seas

[57] ABSTRACT

A photographic printing paper support which comprises a raw paper coated with a film-forming resin on both sides; said raw paper being a paper made from paper stock comprising (i) cationic starch, (ii) polyamidepolyamine epichlorohydrin and (iii) an epoxidized higher fatty acid amide and/or an alkylketene dimer, and optionally (iv) a metal salt of carboxymethyl cellulose and/or an acrylamide/diallylamine salt copolymer, and being adjusted to pH 6.5–8.5 and controlled so as to have a zeta potential in the range of −10 mV to +5 mV.

12 Claims, No Drawings

PHOTOGRAPHIC PRINTING PAPER SUPPORT

FIELD OF THE INVENTION

The present invention relates to a photographic printing paper support and, more particularly, to a support for photographic printing paper in which a raw paper is covered with a fill-forming resin on both sides.

BACKGROUND OF THE INVENTION

In recent years, a waterproof support comprising a raw paper covered with a polyolefin, such as polyethylene, on both sides has been used by preference as a support for photographic printing paper with the intention of not only preventing processing solutions from penetrating into a photographic printing paper support in developing and fixing steps but also reducing a processing time including washing and drying times.

As for the raw paper, the so-called acidic paper has so far been used. The acidic paper is prepared from paper stock to which an anionic sizing agent, an anionic paper-strength reinforcer and a cheap aluminum salt for fixing these anionic chemicals to pulp are added, thereby being rendered acidic.

Recently, however, neutral paper has prevailed as paper for general use because of its advantages, e.g., in having improved keeping quality, enabling the white water discharged in a paper-making step to be disposed in a closed system, preventing equipments from being corroded, and so on.

In using a raw paper for making a support of photographic printing paper, it is required of the raw paper to be hard sized paper. This is because the support should avoid being invaded by a developer via the cut surfaces thereof in the course of development.

When neutral paper is used as raw paper for a photographic printing paper support, therefore, it becomes necessary to incorporate therein not only an alkylketene dimer having self fixability as sizing agent but also a cationic polyacrylamide as paper strength reinforcer. However, the papermaking in the neutral region ($6.0 \leqq$ the pH of paper stock $\leqq 8.5$) is inferior in the drainage on wire cloth to the papermaking in the acidic region ($3.5 \leqq$ the pH of paper stock $<6.0$). Accordingly, the papermaking in the neutral region has a problem of its suffering an increase in drying load. Further, it has drawbacks that the alkylketene dimer used therein as sizing agent is responsible for stains on rolls such as press rolls and tends to render the raw paper surfaces slippery.

Those drawbacks can be mitigated by using a specific cationic polyacrylamide, that is, the cationic polyacrylamide obtained by copolymerizing an acrylamide with cationic monomer(s) and has its molecular weight and cationic value in the respectively specified ranges (as disclosed in JP-A-04-131843, and the term "JP-A" as used herein means an "unexamined published Japanese patent application).

It is also ascertained in the above-cited reference that a further improvement can be brought about by further adding an anionic polyacrylamide in combination with an epoxidized higher fatty acid amide to the foregoing paper stock in the neutral region.

As a result of our further studies of compounds capable of functioning as paper strength reinforcer, it has been found out that when in the process of making a raw paper, (i) the combination of cationic starch and polyamidepolyamine epichlorohydrin, which have so far been thought that they couldn't produce any preferable effect when used independently, is used as a paper strength reinforcer in addition to a sizing agent comprising an epoxidized higher fatty acid amide and/or an alkylketene dimer, (ii) the pH of paper stock is adjusted to the neutral region and (iii) the zeta potential of the paper stock is controlled so as to be in a specified range, the stain troubles in the course of paper-making can be easily prevented from occurring and, what is more, when the raw paper prepared under the foregoing condition is coated with a polyolefin resin on both sides to be made into a photographic printing paper support, the penetration of a developer into the support via the cut surfaces thereof can be considerably reduced. These effects can be further heightened by using a metal salt of carboxymethyl cellulose and/or an acrylamide/diallylamine salt. copolymer, which each have so far been thought to have no favorable effect when used independently, together with the foregoing paper strength reinforcing combination. The present invention has come to be achieved by these findings.

SUMMARY OF THE INVENTION

Therefore, a first object of the present invention is to provide a photographic printing paper support which has reduced penetration of developer in process of development.

A second object of the present invention is to provide a photographic printing paper support which enables a reduction in amount of a sizing agent added and thereby can diminish the generation of stains in processes of papermaking and lamination.

A third object of the present invention is to provide a photographic printing paper support which can be prepared with ease and enables an improvement of the environmental condition in preparation.

A fourth object of the present invention is to provide a photographic printing paper support which can ensure not only satisfactory drainage of paper stock on wire cloth but also no generation of stains on rolls in the process of making a raw paper used therein.

The above-described objects of the present invention are attained with a photographic printing paper support which comprises a raw paper coated with a film-forming resin on beth sides; said raw paper being a paper made from paper stock comprising (i) cationic starch, (ii) polyamide-polyamine epichlorohydrin and (iii) an epoxidized higher fatty acid amide and/or an alkylketene dimer, and optionally (iv) a metal salt of carboxymethyl cellulose and/or an acrylamide/diallylamine salt copolymer, and being adjusted to pH 6.5–8.5 and controlled so as to have a zeta potential in the range of −10 mV to +5 mV.

DETAILED DESCRIPTION OF THE INVENTION

Suitable examples of a film-forming resin used in the present invention include polyolefin resins such as polyethylene, polypropylene, etc., and polybutene, polystyrene, polyvinyl chloride, polyvinylidene chloride, polycarbonate, polyethylene terephthalate, polyamide and polyacrylate resins. Of these resins, polyethylene is preferred in particular from the standpoint of hot-extrusion suitability in covering a raw paper and adhesiveness to a raw paper.

Such film-forming resins have no particular limitations on molecular weight, provided that the resin coating formed by an extrusion coating method can retain therein a white pigment and a colored pigment or a brightening agent. In general, however, resins having their molecular weight in the range of 20,000 to 200,000 are used.

The thickness of a resin coating does not have any particular restriction, and so it can be determined by reference to the thickness range of conventional resin layers for photographic printing paper supports. As a general guide, an appropriate thickness of the resin coating is in the range of 15 to 50 μm.

To the resin coating, there can be added a white pigment, a colored pigment or a brightening agent, and a stabilizing agent such as phenol, bisphenol, thiobisphenol, amines, benzophenone, salicylic acid salts, benzotriazole and organometallic compounds.

In particular, it is advantageous to incorporate a white pigment and a colored pigment in the resin coating formed on the photographic emulsion-applying side.

Additionally, extrusion coating of resins as cited above can be performed with a conventional apparatus, such as an extruder or laminator for polyolefin use.

The raw papers according to embodiments of the present invention are described below in detail.

The cationic starch contained in the raw papers functions as a dry paper strength reinforcer.

Suitable examples of cationic starch include those obtained by modifying various kinds of starch, such as corn starch, tapioca starch, potato starch, etc., with tertiary or quaternary cations. The substitution degree in the cation modification is preferably in the range of 0.02 to 0.06. Further, it is desirable that such cationic starch be added in a proportion of from 0.5 to 5.0% by weight, particularly from 1 to 3% by weight, based on bone dry pulp.

In the present invention also, it is desirable to add polyacrylamides together with cationic starch. Such polyacrylamides include anionic, cationic and amphoteric ones. However, it is particularly preferable to add an amphoteric polyacrylamide together with cationic starch. The term "an amphoteric polyacrylamide" as used herein is intended to include amphoteric copolymers containing an acrylamide or methacrylamide as a main monomer component and obtained by the copolymerization of the main monomer and comonomers comprising both anionic and cationic monomers. It is preferable for these copolymers to have an average molecular weight in the range of $2.0 \times 10^6$ to $5.0 \times 10^6$, particularly $2.0 \times 10^6$ to $3.5 \times 10^6$, when measured by GPC method (which stands for gel permeation chromatography).

The foregoing amphoteric polyacrylamide is effective when added in a proportion of from 0.01 to 5.0% by weight, particularly from 0.1 to 1.0% by weight, based on bone dry pulp.

Further, the raw papers according to the present invention contain a polyamidepolyamine epichlorohydrin as a wet paper strength reinforcer.

The proportion of the polyamidepolyamine epichlorohydrin added is preferably in the range of from 0.05 to 3.0% by weight, particularly from 0.2 to 1.0% by weight, based on bone dry pulp.

In a preferred embodiment of the present invention, the raw paper contains a metal salt of carboxymethyl cellulose in addition to the combination of the cationic starch with the polyamidepolyamine epichlorohydrin.

Carboxymethyl cellulose is a cellulose in which part of the OH hydrogens of cellulose are replaced by carboxymethyl groups through etherification, and the sodium salt thereof is particularly preferred in the present invention.

The etherification degree of the carboxymethyl cellulose used herein is preferably in the range of 0.5 to 0.8, and the average polymerization degree thereof ranges preferably from 300 to 500.

The proportion of the metal salt of carboxymethyl cellulose added is preferably in the range of 0.01 to 1.0% by weight, particularly 0.05 to 0.5% by weight, based on bone dry pulp.

In another preferred embodiment of the present invention, the raw paper contains an acrylamide/diallylamine salt copolymer in addition to cationic starch as dry paper strength reinforcer and polyamidepolyamine epichlorohydrin as wet paper strength reinforcer.

In preparing the copolymer, acrylamide or methylmethacrylamide is used as the acrylamide component and an inorganic salt of diallylamine, such as the hydrochloride, sulfate or phosphate thereof, or an organic salt of diallylamine, such as the formate, acetate or propionate thereof, is used as the diallylamine salt component.

The ratio of the acrylamide component to the diallylamine salt component is desirably in the range of 1/1 to 10/1 by mole.

In addition to the above-described two components, other vinyl monomers, such as acrylonitrile, vinyl acetate, acrylic acid, dimethylaminoethylacrylate, etc., can be used as the third component of the foregoing copolymer, if desired.

It is preferable for such copolymers to have an average molecular weight ranging from $5.0 \times 10^4$ to $1.0 \times 10^6$, particularly from $1.0 \times 10^5$ to $5.0 \times 10^5$, when measured by GPC method These copolymers are preferably added in a proportion of from 0.01 to 2.0% by weight, particularly from 0.05 to 0.5% by weight, based on bone dry pulp.

In still another preferred embodiment of the present invention, the raw paper contains not only the combination of cationic starch with polyamidepolyamine epichlorohydrin but also both the foregoing metal salt of carboxymethyl cellulose and acrylamide/diallylamine salt copolymer.

In every embodiment of the present invention, it is desirable that the raw paper further contain an epoxidized higher fatty acid amide and/or an alkylketene dimer.

Epoxidized higher fatty acid amides used in the present invention function as a sizing agent. Specific examples thereof include the condensation products of fatty acids and polyamines as disclosed, e.g., in JP-B-38-20601 (the term "JP-B" as used herein means an "examined Japanese patent publication"), JP-B-39-4507, U.S. Pat. No. 3,692,092, and the reaction products of alkenylsuccinic acids and polyamines as disclosed in JP-A-51-1705.

Of the fatty acids as cited above, those preferred in the present invention are higher aliphatic mono- and polycarboxylic acids containing 8 to 30, especially 12 to 25, carbon atoms. Specific examples of such aliphatic carboxylic acids include stearic acid, oleic acid, lauric acid, palmitic acid, arachic acid, behenic acid, tall oil fatty acid, alkylsuccinic acid, alkenylsuccinic acid, and so on. Of these fatty acids, behenic acid is favored in particular. Additionally, the fatty acids cited above may be used as a mixture of two or more thereof.

As for the polyamines, polyalkylenepolyamines, especially those having two or three amino groups, are preferable.

Specific examples of such polyamines include diethylenetriamine, triethylenetetramine, tetraethylenepentamine, pentaethylenehexamine, dipropylenetriamine, tripropylenetetramine, aminoethylethanolamine, and so on.

For the purpose of preventing the sizing agent from falling off the pulp by mechanical agitation, it is effective in particular to convert the reaction products of aliphatic carboxylic acids and polyamines into the quaternary salts via the reaction with epichlorohydrin.

The epoxidized higher fatty acid amides are added in a proportion ranging preferably from 0.1 to 3.0% by weight, particularly preferably ranging from 0.3 to 1.5% by weight, based on bone dry pulp.

To the pulp slurry used in the present invention, it is desirable to further add a polyvalent metal salt as a fixing agent. As for the polyvalent metal salt, water-soluble aluminum salts, such as aluminum sulfate, aluminum chloride, etc., are preferred in particular. It is desirable for such a fixing agent to be added to pulp slurry in a concentration of from 0.1 to 1.0% by weight.

When the pH of pulp slurry shifts to the acidic side by the addition of polyvalent metal salts as described above, it is desired to add an alkaline compound, such as sodium hydroxide, sodium aluminate or the like, in order to control the pH to a neutral region, namely the region of 6.5 to 8.5. The pH control as described above is effective in ensuring good keeping quality to a photographic printing paper support as well as raw paper.

As for the alkylketene dimer used in the present invention, those derived from higher fatty acids containing 8 to 30 carbon atoms. In particular, the alkylketene dimer derived from behenic acid is used to advantage. A suitable proportion of the alkylketene dimer is in the range of 0.1 to 3.0% by weight, particularly 0.3 to 1.5% by weight, based on bone dry pulp.

In the preparation of the raw paper according to every embodiment, it is preferable that the zeta potential of the paper stock (the term "paper stock" used herein signifies the pulp slurry in which the addition of ingredients as needed or desired herein is completed) be adjusted to the range of −10 to +5 mV, particularly −5 to +1 mV. When the zeta potential is below −10 mV or above +5 mV, the resulting raw paper is unable to serve for photographic printing paper since a developer can penetrate to a considerable depth from the cut end of the resulting photographic printing paper upon development.

The zeta potential adjustment can be effected by adding anionic substances to pulp slurry. This is because, although pulp is generally an anionic substance, it is desirable to use cationic substances as paper strength reinforces, sizing agents and other additives added to pulp slurry for giving thereto the characteristics required of neutral paper for photographic printing paper use, and such additives are used in large amounts. As a result of it, the pulp slurry as a whole becomes cationic after the addition of all chemicals required.

As the agent for adjustment of the zeta potential, carboxymethyl cellulose is used to advantage. In particular, the sodium salt thereof is effective. Further, carboxy-modified polyvinyl alcohol or/and sodium polyacrylate can be used together with the above-cited one.

Every raw paper according to the present invention may optionally contain conventional additives, including fillers such as clay, talc, kaolinite, calcium carbonate, titanium oxide, fine particles of urea resin, etc., sizing agents such as rosin, higher fatty acid salts, paraffin wax, alkenylsuccinic acid anhydrides, styrene/acrylic acid copolymers, etc., paper strength reinforcers such as gelatin, etc., wet paper strength reinforcers such as melamine-formaldehyde condensates, etc., dyes, fluorescent whitening agents, antifoaming agents, and so on.

As for the process of adding the chemicals as described above, it is desirable that anionic polyacrylamides, water-soluble aluminum salts, alkaline substances and the acrylamide/diallylamine salt copolymer be added in the order of description. The addition of alkaline substances is controlled so that the final pH of paper stock may be in the range of 6.5 to 5.

The epoxidized higher fatty acid amides and the alkylketene dimers can satisfactorily exhibit their sizabilities even when they are added at any stage of papermaking. However, the addition thereof during the first half period of the foregoing addition process is advantageous in that higher sizability is attained because they can be dispersed more homogeneously.

Wet paper strength reinforcers, including the polyamide-polyamine epichlorohydrin according to the present invention, may also be added at any stage of papermaking.

The raw paper substrate as described above may be impregnated or coated with a solution containing various water-soluble additives by means of a size press, a tub size, a gate roll coater or the like. Specific examples of water-soluble additives as described above include high molecular compounds such as starch, polyvinyl alcohol, carboxy-modified polyvinyl alcohol, carboxymethyl cellulose, hydroxyethyl cellulose, sodium alginate, cellulose sulfate, gelatin, casein, etc., and metal salts such as calcium chloride, sodium chloride, sodium sulfate, etc.

To the solution containing water-soluble additives as cited above, there may be further added a hygroscopic compound such as glycerol, polyethylene glycol or the like, a coloring or brightening material such as dyes, an optical whitening agent or the like, and a pH controlling agent such as sodium hydroxide, aqueous ammonia, hydrochloric acid, sulfuric acid, sodium carbonate, etc. In addition, pigments may be added to the foregoing solution, if needed.

The raw paper substrate is not particularly restricted in its species and thickness. However, it is desired that the substrate have a basis weight ranging from 50 to 250 $g/m^2$. Further, it is preferable that the substrate be subjected to a surface treatment by applying thereto heat and pressure with a machine calender or a super calender, because a raw paper having excellent surface smoothness and flatness is required from the standpoint of ensuring satisfactory flatness to the photographic printing paper.

The present photographic printing paper support is coated with photographic emulsions on the glossy side thereof, and then dried to be made into a photographic printing paper. Additionally, it may take other various modes of structure, for example, such a structure as to have on the back side the typewritten letters holding layer disclosed in JP-A-62-6256.

In accordance with embodiments of the present invention, a photographic printing paper support uses a raw paper which is made in the neutral region of pH using the paper stock comprising (i) cationic starch, (ii) polyamide-polyamine epichlorohydrin and (iii) an epoxidized higher fatty acid amide and/or an alkylketene dimer, and optionally (iv) a metal salt of carboxymethyl cellulose and/or an acrylamide/diallylamine salt copolymer, and that being controlled so as to have a zeta potential in the range of −10 mV to +5 mV. In addition, the raw paper is on the both sides covered with a resin having a film-forming ability. Thus, the penetration of a developer into the support via the edges as cut surfaces can be reduced to a considerable extent, and the generation of stain in the process of papermaking can be diminished since the amount of the alkylketene dimer added can be reduced by the use of the present combination of paper strength reinforcers.

The present invention will now be illustrated in more detail by reference to the following examples.

EXAMPLE 1

A pulp slurry having Canadian freeness of 250 ml was obtained by beating a wood pulp mixture containing LBKP and NBSP in a ratio of 70:30 by weight). To the pulp slurry in an amount of 100 parts by weight, (1) 2.0 parts by weight of cationic starch, (2) 0.2 part by weight of epoxidized behenic acid amide, (3) 0.4 part by weight of polyamide-polyamine epichlorohydrin, (4) 0.7 part by weight of the alkylketene dimer derived from behenic acid and (5) 0.2 part by weight of sodium polyacrylate were added with agitation, and further (6) sodium hydroxide was added in such an amount as to adjust the resulting mixture to pH 7.5.

The zeta potential of the thus prepared paper stock was measured with a zeta potential measurement apparatus, Model 501, produced by Penken Co. The measured value was +4 mV.

Then, a paper was made from this paper stock so as to have a basis weight of 180 g/m$^2$, and sizepress-coated with a sizing solution having the composition set forth in Table 1. Therein, the amount of the solution adhering thereto was controlled to 30 g/m$^2$.

TABLE 1

| Ingredient | Proportion |
|---|---|
| Polyvinyl alcohol | 5.0 wt % |
| Calcium chloride | 4.0 wt % |
| Fluorescent whitening agent | 0.5 wt % |
| Antifoaming agent | 0.005 wt % |
| Water | 90.495 wt % |

The thickness of the sized paper thus obtained was adjusted to 173 μm by means of a machine calender. Then, the paper underwent a corona discharge treatment on the back side, and thereon was coated polyethylene having a density of 0.980 g/m$^3$ so as to have a thickness of about 30μm. Further, the front side (the side on which photographic emulsions are to be coated) of the paper underwent a corona discharge, and thereon was coated the polyethylene containing titanium oxide in a proportion of 10 wt % and having a density of 0.960 g/m$^3$ so as to have a thickness of about 30 μm. Thus, a photographic printing paper support was obtained.

A color photographic printing paper obtained by coating color emulsions on the foregoing paper support was processed with an automatic developing machine, and then the processed printing paper was examined for the depth of the processing solutions penetrating thereinto from the edges, and the penetration depth was found to be 0.47 mm, that is, significantly small. Thus, the printing paper thus prepared has proved to be highly satisfactory.

EXAMPLE 2

To the same pulp slurry as used in Example 1 in an amount of 100 parts by weight, (1) 2.0 parts by weight of cationic starch, (2) 0.2 part by weight of epoxidized behenic acid amide, (3) 0.7 part by weight of polyamidepolyamine epichlorohydrin, (4) 0.4 part by weight of the alkylketene dimer derived from behenic acid and (5) 0.2 part by weight of sodium salt of carboxymethyl cellulose were added with agitation, and further (6) sodium hydroxide was added in such an amount as to adjust the resulting mixture to pH 7.5. A photographic printing paper was produced using the thus prepared paper stock and according to the procedure adopted in Example 1. In analogy with Example 1, the printing paper obtained was examined for the penetration depth of the processing solutions, and the penetration depth was found to be 0.43mm. Thus, the printing paper obtained herein has also proved to be quite satisfactory. Additionally, the paper stock used was confirmed to have a zeta potential of +1 mV from the same measurement as described in Example 1.

EXAMPLE 3

Paper stock was prepared in the same manner as in Example 2, except that the amount of the sodium salt of carboxymethyl cellulose added was changed to 0.35 part by weight. A photographic printing paper was also obtained in the same manner as in Example 1, except that the foregoing paper stock was used, and, in analogy with Example 1, examined for the penetration depth of the processing solutions. Therein, the penetration depth was 0.39 mm. Thus, the printing paper obtained herein has also proved to be quite satisfactory. Additionally, the paper stock used was confirmed to have a zeta potential of −5 mV from the same measurement as described in Example 1.

EXAMPLE 4

To the same pulp slurry as used in Example 1 in an amount of 100 parts by weight, (1) 2.0 parts by weight of cationic starch, (2) 0.2 part by weight of epoxidized behenic acid amide, (3) 0.4 part by weight of polyamidepolyamine epichlorohydrin, (4) 0.7 part by weight of the alkylketene dimer derived from behenic acid and (5) 0.2 part by weight of sodium salt of carboxymethyl cellulose were added with agitation, and further (6) sodium hydroxide was added in such an amount as to adjust the resulting mixture to pH 7.0. A photographic printing paper was produced using the thus prepared paper stock and according to the procedure adopted in Example 1. In analogy with Example 1, the printing paper obtained was examined for the penetration depth of the processing solutions, and the penetration depth was found to be 0.38 mm. Thus, the printing paper obtained herein has also proved to be quite satisfactory. Additionally, the paper stock used was confirmed to have a zeta potential of −3 mV from the same measurement as described in Example 1.

Comparative Example 1

Paper stock was prepared in the same manner as in Example 1, except that the cationic starch was not added at all. A photographic printing paper was also obtained in the same manner as in Example 1, except that the foregoing paper stock was used, and, in analogy with Example 1, examined for the penetration depth of the processing solutions. Therein, the penetration depth was 1.21 mm, that is, too great. Thus, it has proved that the thus obtained printing paper cannot stand practical use. Additionally, the paper stock used was confirmed to have a zeta potential of −12 mV from the same measurement as described in Example 1.

Comparative Example 2

Paper stock was prepared in the same manner as in Example 1, except that the polyamidepolyamine epichlorohydrin was not added at all. A photographic printing paper was also obtained in the same manner as in Example 1, except that the foregoing paper stock was used, and, in analogy with Example 1, examined for the penetration depth of the processing solutions. Therein, the penetration depth was 1.02 mm, that is, too great. Thus, it has proved that the thus obtained printing paper cannot stand practical use. Additionally, the paper stock used was confirmed to have a zeta potential of –30 mV from the same measurement as described in Example 1.

Comparative Example 3

Paper stock was prepared in the same manner as in Example 1, except that sodium salt of carboxymethyl cellulose was not added at all. A photographic printing paper was also obtained in the same manner as in Example 1, except that the foregoing paper stock was used, and, in analogy with Example 1, examined for the penetration depth of the processing solutions. Therein, the penetration depth was 0.67 mm, that is, great. Thus, it has proved that the thus obtained printing paper cannot stand practical use. Additionally, the paper stock used was confirmed to have a zeta potential of +23 mV from the same measurement as described in Example 1.

Comparative Example 4

Paper stock was prepared in the same manner as in Example 3, except that sodium salt of carboxymethyl cellulose was not added at all. A photographic printing paper was also obtained in the same manner as in Example 1, except that the foregoing paper stock was used, and, in analogy with Example 1, examined for the penetration depth of the processing solutions. Therein, the penetration depth was 0.67 mm, that is, great. Thus, it has proved that the thus obtained printing paper cannot stand practical use. Additionally, the paper stock used was confirmed to have a zeta potential of +12 mV from the same measurement as described in Example 1.

Now, the results obtained in the foregoing Examples and Comparative Examples are summarized in Table 2.

250,000), and (6) 0.25 part by weight of sodium salt of carboxymethyl cellulose were added with agitation. Further, the resulting pulp slurry was adjusted to pH 8.0 by the addition of $NaHCO_3$.

Then, a paper was made from this pulp slurry so as to have a basis weight of 180 g/m$^2$, and sizepress-coated with a sizing solution having the composition set forth in Table 3. Therein, the amount of the solution adhering thereto was controlled to 30 g/m$^2$.

TABLE 3

| Ingredient | Proportion |
|---|---|
| Polyvinyl alcohol | 5.0 wt % |
| Calcium chloride | 4.0 wt % |
| Fluorescent whitening agent | 0.5 wt % |
| Antifoaming agent | 0.005 wt % |
| Water | 90.495 wt % |

The thickness of the sized paper thus obtained was adjusted to 173 μm by means of a machine calender. Then, the paper underwent a corona discharge treatment on the back side, and thereon was coated polyethylene having a density of 0.980 g/m$^3$ so as to have a thickness of about 30 μm. Further, the front side (the side on which photographic emulsions are to be coated) of the paper underwent a corona discharge, and thereon was coated the polyethylene containing titanium oxide in a proportion of 10 wt % and having a density of 0.960 g/m$^3$ so as to have a thickness of about 30 μm. Thus, a photographic printing paper support was obtained.

A color photographic printing paper obtained by coating color emulsions on the foregoing paper support was processed with an automatic developing machine, and then the processed printing paper was examined for the depth of the processing solutions penetrating thereinto from the edges, and the penetration depth was found to be significantly small, namely 0.35 mm as shown in Table 4. Thus, the

TABLE 2

| | Amount added (parts by weight) | | | | | | | |
|---|---|---|---|---|---|---|---|---|
| Ingredient | Example 1 | Example 2 | Example 3 | Example 4 | Compar. Example 1 | Compar. Example 2 | Compar. Example 3 | Compar. Example 4 |
| Cationic starch | 2.0 | 2.0 | 2.0 | 2.0 | — | 2.0 | 2.0 | 2.0 |
| Polyamidepolyamine epichlorohydrin | 0.4 | 0.7 | 0.7 | 0.4 | 0.7 | — | 0.7 | 0.4 |
| Epoxidized behenic acid amide | 0.2 | 0.2 | 0.2 | 0.2 | 0.2 | 0.2 | 0.2 | 0.2 |
| Alkylketene dimer | 0.7 | 0.4 | 0.4 | 0.7 | 0.4 | 0.4 | 0.4 | 0.7 |
| Na salt of carboxymethyl cellulose | — | 0.2 | 0.35 | 0.2 | 0.2 | 0.2 | — | — |
| Sodium polyacrylate | 0.2 | — | — | — | — | — | — | — |
| Zeta potential (mV) | +4 | +1 | –5 | –3 | –12 | –30 | +23 | +12 |
| Penetration depth (mm) | 0.47 | 0.43 | 0.39 | 0.38 | 1.21 | 1.02 | 0.67 | 0.61 |

printing paper thus prepared has proved to be quite satisfactory. Additionally, the paper slurry after pH adjustment was confirmed to have a zeta potential of –8 mV from the same measurement as described in Example 1.

EXAMPLE 5

A pulp slurry having Canadian freeness of 280 ml was obtained by beating a wood pulp mixture containing LBKP, LBSP and NBSP in a ratio of 70:15:15 by weight. To the pulp slurry in an amount of 100 parts by weight, (1) 2.0 parts by weight of cationic starch, (2) 0.3 part by weight of epoxidized behenic acid amide, (3) 0.4 part by weight of polyamidepolyamine epichlorohydrin, (4) 0.5 part by weight of the alkylketene dimer derived from behenic acid, (5) 0.05 part by weight of an acrylamide/diallylamine sulfate copolymer (ratio of monomers: 70/30 by mole, molecular weight:

EXAMPLES 6 AND 7

Two other samples of paper stock were prepared in the same manner as in Example 5, except that the amount of the copolymer used was changed so as to be shown in Table 4. Photographic printing papers were obtained in the same manner as in Example 5, except that the foregoing paper stock samples were used respectively, and, in analogy with Example 5, examined for the penetration depth of the processing solutions. Therein, the penetration depth of one printing paper was found to be 0.33 mm and that of the other printing paper was found to be 0.30 mm, that is, they were significantly small. Thus, the printing papers obtained herein have also proved to be quite satisfactory. Additionally, the paper stock samples used were confirmed to have zeta potentials of −5 mV and −4 mV respectively from the same measurement as described in Example 1.

EXAMPLE 8

Another sample of paper stock was prepared in the same manner as in Example 5, except that sodium polyacrylate was added in an amount of 0.25 part by weight instead of the sodium salt of carboxymethyl cellulose. A photographic printing paper was obtained in the same manner as in Example 5, except that the foregoing paper stock sample was used and, in analogy with Example 5, examined for the penetration depth of the processing solutions. Therein, the penetration depth of the printing paper was found to be 0.42 mm, that is, it was significantly small. Thus, the printing paper obtained herein has also proved to be quite satisfactory. Additionally, the paper stock sample used was confirmed to have a zeta potential of $\mp$mV from the same measurement as described in Example 1.

The thus obtained results are summarized in Table 4.

3. A photographic printing paper support according to claim 1, wherein the paper stock contains the cationic starch in a proportion of from 0.5 to 5.0% by weight, based on bone dry pulp.

4. A photographic printing paper support according to claim 3, wherein the cationic starch is a starch modified with tertiary or quaternary cations in a modification degree of from 0.02 to 0.06.

5. A photographic printing paper support according to claim 1, wherein the paper stock contains the polyamide-polyamine epichlorohydrin in a proportion of from 0.05 to 3.0% by weight, based on bone dry pulp.

6. A photographic printing paper support according to claim 1, wherein the paper stock contains the epoxidized behenic acid amide in a proportion of from 0.1 to 3.0% by weight, based on bone dry pulp.

7. A photographic printing paper support according to claim 1, wherein the paper stock contains the alkylketene dimer in a proportion of from 0.1 to 3.0% by weight, based on bone dry pulp.

8. A photographic printing paper support according to claim 2, wherein the paper stock contains a metal salt of carboxymethyl cellulose in a proportion of 0.01 to 1.0% by weight, based on bone dry pulp.

9. A photographic printing paper support according to claim 8, wherein the metal salt of carboxymethyl cellulose is sodium salt thereof.

TABLE 4

| Ingredient | Amount added (parts by weight) | | | |
|---|---|---|---|---|
| | Example 5 | Example 6 | Example 7 | Example 8 |
| Cationic starch | 2.0 | 2.0 | 2.0 | 2.0 |
| Polyamidepolyamine epichlorohydrin | 0.4 | 0.4 | 0.4 | 0.4 |
| Epoxidized behenic acid amide | 0.3 | 0.3 | 0.3 | 0.3 |
| Alkylketene dimer | 0.5 | 0.5 | 0.5 | 0.5 |
| Acrylamide/diallylamine sulfate copolymer | 0.05 | 0.10 | 0.15 | 0.05 |
| Sodium salt of carboxymethyl cellulose | 0.25 | 0.25 | 0.25 | — |
| Sodium polyacrylate | — | — | — | 0.25 |
| Zeta potential (mV) | −8 | −5 | −4 | $\mp$ |
| Penetration depth (mm) | 0.35 | 0.33 | 0.30 | 0.42 |

What is claimed is:

1. A photographic printing paper support which comprises a raw paper coated with a film-forming resin on both sides; said raw paper being a paper made from paper stock which comprises (i) cationic starch, (ii) polyamidepolyamine epichlorohydrin and (iii) an epoxidized behenic acid amide and an alkylketene dimer, and is adjusted to pH 6.5–8.5 and controlled so as to have a zeta potential in the range of −10 mV to +5 mV.

2. A photographic printing paper support according to claim 1, said paper stock further containing (iv) at least one of a metal salt of carboxymethyl cellulose and an acrylamide/diallylamine salt copolymer.

10. A photographic printing paper support according to claim 8, wherein the metal salt of carboxymethyl cellulose has an etherification degree of from 0.5 to 0.8 and an average polymerization degree of from 300 to 500.

11. A photographic printing paper support according to claim 2, wherein the paper stock contains an acrylamide/diallylamine salt copolymer in a proportion of 0.01 to 2.0% by weight, based on bone dry pulp.

12. A photographic printing paper support according to claim 11, wherein the acrylamide/diallylamine salt copolymer comprises the acrylamide component and the diallylamine salt component in a ratio of from 1/1 to 10/1 by mole and has an average molecular weight of from $5\times10^4$ to $1.0\times10^6$.

* * * * *